United States Patent
Yi (10) Patent No.: US 11,315,508 B2
(45) Date of Patent: Apr. 26, 2022

(54) LIQUID CRYSTAL DISPLAY PANEL

(71) Applicant: SHENZHEN CHINA STAR OPTOELECTRONICS SEMICONDUCTOR DISPLAY TECHNOLOGY CO., LTD., Shenzhen (CN)

(72) Inventor: Ningbo Yi, Shenzhen (CN)

( * ) Notice: Subject to any disclaimer, the term of this patent is extended or adjusted under 35 U.S.C. 154(b) by 247 days.

(21) Appl. No.: 16/626,360

(22) PCT Filed: Dec. 19, 2019

(86) PCT No.: PCT/CN2019/126627
§ 371 (c)(1),
(2) Date: Dec. 24, 2019

(87) PCT Pub. No.: WO2021/103217
PCT Pub. Date: Jun. 3, 2021

(65) Prior Publication Data
US 2021/0358434 A1    Nov. 18, 2021

(30) Foreign Application Priority Data

Nov. 27, 2019  (CN) .......................... 201911179724.6

(51) Int. Cl.
| | |
|---|---|
| *G06F 3/038* | (2013.01) |
| *G09G 5/00* | (2006.01) |
| *G09G 3/36* | (2006.01) |
| *G02F 1/1335* | (2006.01) |
| *G02F 1/1343* | (2006.01) |
| *G02F 1/1362* | (2006.01) |

(52) U.S. Cl.
CPC ..... *G09G 3/3648* (2013.01); *G02F 1/133514* (2013.01); *G02F 1/134309* (2013.01); *G02F 1/136286* (2013.01); *G02F 2201/121* (2013.01); *G09G 2300/0426* (2013.01); *G09G 2310/08* (2013.01); *G09G 2320/046* (2013.01)

(58) Field of Classification Search
CPC ............ G02F 1/136286; G02F 1/1368; G09G 2300/0426; G09G 3/3648
See application file for complete search history.

(56) References Cited

U.S. PATENT DOCUMENTS

| | | | |
|---|---|---|---|
| 2008/0158131 A1* | 7/2008 | Park ..................... | G09G 3/3614 345/98 |
| 2009/0225063 A1* | 9/2009 | Shigaki ................ | G09G 3/3677 345/204 |

(Continued)

FOREIGN PATENT DOCUMENTS

| | | |
|---|---|---|
| CN | 104700796 A | 6/2015 |
| CN | 105741717 A | 7/2016 |
| WO | 2018173281 A1 | 9/2018 |

*Primary Examiner* — Nan-Ying Yang (57) ABSTRACT

The present invention provides a liquid crystal display panel including a color film substrate and an array substrate, and a plurality of input terminals, a scan line, and a data line. Wherein each of the input terminals is respectively connected to at least two data lines, a signal screening unit in series between at least part of the data lines and the corresponding input terminal. The input terminal is connected to an alternating current signal, and the signal screening unit is used for screening the alternating current signal to select a positive voltage signal or a negative voltage signal to the data lines.

7 Claims, 10 Drawing Sheets

(56) References Cited

U.S. PATENT DOCUMENTS

| | | | |
|---|---|---|---|
| 2012/0062451 A1* | 3/2012 | Morishita | G02F 1/134363 345/87 |
| 2013/0257837 A1* | 10/2013 | Wang | G09G 3/3688 345/211 |
| 2015/0161956 A1 | 6/2015 | Lee et al. | |
| 2016/0189657 A1 | 6/2016 | Oh | |
| 2016/0329025 A1 | 11/2016 | Park et al. | |
| 2020/0135110 A1 | 4/2020 | Yokoyama et al. | |

* cited by examiner

LIQUID CRYSTAL DISPLAY PANEL

FIELD OF INVENTION

The disclosure relates to the display technical field, and more particularly, to a liquid crystal display panel.

BACKGROUND OF INVENTION

In general, in a 1 Gate 1 Data (1G1D) or 2 Gate 2 Data (2G2D) driving structure of liquid crystal display panels, each data lines corresponds to one input terminal. As resolution of panels increases, the number of input terminals also greatly increases, so that a line width of peripheral circuits is greatly reduced, which improves difficulty of subsequent outer lead bonding (OLB) processes, resulting in lower product yield.

SUMMARY OF INVENTION

As resolution of panela is increased, the number of input terminals is also greatly increased, so that a line width of peripheral circuits is greatly reduced, resulting in a technical problem of lowering product yield.

A liquid crystal display panel comprises a color film substrate and an array substrate, and a pixel unit, a plurality of input terminals, a plurality of crisscrossed scan lines and data lines, which are disposed on the array substrate in an array arrangement. The scan lines and the data lines are crisscrossed to form a grid structure corresponding to the pixel unit, each of the scan lines is respectively connected to a column of the pixel unit, and each of the data lines is respectively connected to a row of the pixel unit.

Wherein each of the input terminals is respectively connected to at least two data lines, a signal screening unit in series between at least part of the data lines and the corresponding input terminal. The input terminal is connected to an alternating current signal, and the signal screening unit is used for screening the alternating current signal to select a positive voltage signal or a negative voltage signal to the data lines.

Further, each of the data lines is arranged along a lateral interval, wherein the signal screening unit which is independent with one another is connected in series between all of the data lines and the corresponding input terminal, a first signal screening unit is connected to a first data line screens and passes the positive voltage signal, and a second signal screening unit is connected to a second data line screens and passes the negative voltage signal.

Further, each of the input terminals is respectively connected to any two adjacent signal screening units. A nth data line is the first data line, a (n+1)th data line is the second data line, and n is a positive integer and is greater than or equal to 1.

Further, a common electrode corresponding to the pixel unit is disposed on the color film substrate, the common electrode comprises a first electrode and a second electrode which are independent with one another. The first electrode comprises a first main electrode line disposed along a lateral direction and a plurality of first branch electrode lines disposed along a longitudinal direction and electronically connected to the first main electrode. The second electrode comprises a second main electrode line disposed along a lateral direction and a plurality of second branch electrode lines disposed along a longitudinal direction and electronically connected to the second main electrode. The first branch electrode lines and the second branch electrode lines are arranged along lateral intervals.

Further, in mth frame, input voltages of the first electrode and the second electrode are both 0V. In (m+1)th frame, the input voltage of the first electrode is greater than the first data line, the input voltage of the second electrode is less than the second data line, and m is a positive integer and is greater than or equal to 1.

Further, a common electrode corresponding to the pixel unit is disposed on the color film substrate, and the common electrode is arranged in a whole surface.

Further, a first signal screening unit which is independent with one another is connected in series between a first data line and the corresponding input terminal, a second data line is not connected to the signal screening unit, and the first signal screening unit is used for screening and passing the positive voltage signal.

Further, a common electrode corresponding to the pixel unit is disposed on the color film substrate, the common electrode comprises a third first electrode and a second electrode which are independent with one another. The first electrode comprises a first main electrode line disposed along a lateral direction and a plurality of first branch electrode lines disposed along a longitudinal direction and electronically connected to the first main electrode. The second electrode comprises a second main electrode line disposed along a lateral direction and a plurality of second branch electrode lines disposed along a longitudinal direction and electronically connected to the second main electrode. The first branch electrode lines and the second branch electrode lines are arranged along lateral intervals.

Further, in mth frame, input voltages of the first electrode and the second electrode are both 0V. In (m+l)th frame, the input voltage of the first electrode is greater than the first data line, the input voltage of the second electrode is 0V, and m is a positive integer and is greater than or equal to 1.

Further, in mth frame, input voltages of the third electrode and the fourth electrode are both 0V. In (m+1)th frame, the input voltage of the third electrode is greater than the third data line, the input voltage of the fourth electrode is 0V, and m is a positive integer and is greater than or equal to 1.

A liquid crystal display panel comprises a color film substrate and an array substrate, and a pixel unit, a plurality of input terminals, a plurality of crisscrossed scan lines and data lines, which are disposed on the array substrate in an array arrangement.

Wherein each of the input terminals is respectively connected to at least two data lines, a signal screening unit in series between at least part of the data lines and the corresponding input terminal. The input terminal is connected to an alternating current signal, and the signal screening unit is used for screening the alternating current signal to select a positive voltage signal or a negative voltage signal to the data lines.

Further, each of the data lines is arranged along a lateral interval, wherein the signal screening unit which is independent with one another is connected in series between all of the data lines and the corresponding input terminal, a first signal screening unit is connected to a first data line screens and passes the positive voltage signal, and a second signal screening unit is connected to a second data line screens and passes the negative voltage signal.

Further, each of the input terminals is respectively connected to any two adjacent signal screening units. A nth data line is the first data line, a (n+1)th data line is the second data line, and n is a positive integer and is greater than or equal to 1.

Further, a common electrode corresponding to the pixel unit is disposed on the color film substrate, the common electrode comprises a first electrode and a second electrode which are independent with one another. The first electrode comprises a first main electrode line disposed along a lateral direction and a plurality of first branch electrode lines disposed along a longitudinal direction and electronically connected to the first main electrode. The second electrode comprises a second main electrode line disposed along a lateral direction and a plurality of second branch electrode lines disposed along a longitudinal direction and electronically connected to the second main electrode. The first branch electrode lines and the second branch electrode lines are arranged along lateral intervals.

Further, in mth frame, input voltage of the first electrode and the second electrode are both 0V. In (m+1)th frame, the input voltage of the first electrode is greater than the first data line, the input voltage of the second electrode is less than the second data line, and m is a positive integer and is greater than or equal to 1.

Further, a common electrode corresponding to the pixel unit is disposed on the color film substrate, and the common electrode is arranged in a whole surface.

Further, a first signal screening unit which is independent with one another is connected in series between a first data line and the corresponding input terminal, a second data line is not connected to the signal screening unit, and the first signal screening unit is used for screening and passing the positive voltage signal.

Further, a common electrode corresponding to the pixel unit is disposed on the color film substrate, the common electrode comprises a first electrode and a second electrode which are independent with one another. The first electrode comprises a first main electrode line disposed along a lateral direction and a plurality of first branch electrode lines disposed along a longitudinal direction and electronically connected to the first main electrode. The second electrode comprises a second main electrode line disposed along a lateral direction and a plurality of second branch electrode lines disposed along a longitudinal direction and electronically connected to the second main electrode. The first branch electrode lines and the second branch electrode lines are arranged along lateral intervals.

Further, in mth frame, input voltages of the first electrode and the second electrode are both 0V. In (m+1)th frame, the input voltage of the first electrode is greater than the first data line, the input voltage of the second electrode is 0V, and m is a positive integer and is greater than or equal to 1.

Further, in mth frame, input voltages of the third electrode and the fourth electrode are both 0V. In (m+1)th frame, the input voltage of the third electrode is greater than the third data line, the input voltage of the fourth electrode is 0V, and m is a positive integer and is greater than or equal to 1.

Further, the first signal screening unit comprises a first switch transistor, a source of the first switch transistor is electrically connected to the corresponding input terminal, a drain of the first switch transistor is electrically connected to the corresponding the data line, and a gate of the first switch transistor is electrically connected to the source of the first switch transistor.

Further, the second signal screening unit comprises a second switch transistor, a source of the second switch transistor is electrically connected to the corresponding input terminal, a drain of the second switch transistor is electrically connected to the corresponding the data line, and a gate of the second switch transistor is electrically connected to the source of the second switch transistor.

An input terminal is respectively connected to at least two or more data lines and a signal screening unit screens alternative current, which reduces the number of the input terminals during panel design and production and reduce a risk of short circuit in inputting form data lines. Meanwhile, a line width of peripheral circuits does not need to be narrower in design, which may effectively reduce a difficulty of OLB and the number of flip chip films, and increase a boding strength of the flip chip films and product yield.

DESCRIPTION OF DRAWINGS

In order to more clearly illustrate the technical solutions of the embodiments of the present invention, the drawings used in the description of the embodiments will be briefly described as below. Obviously, the drawings described as below are just some embodiments of the present invention. For one of ordinary skill in the art, under the premise of no creative labor, other drawings can also be obtained according to these drawings.

Figure numerals: color film substrate 10, array substrate 20, liquid crystal layer 30, seal 40, pixel unit 50, first data line 60, second data line 70, common electrode 80, first electrode 81, first main electrode line 811, first branch electrode line 812, second electrode 82, second main electrode line 821, second branch electrode line 822, first electrode 83, first main electrode line 831, first branch electrode line 832, second electrode 84, second main electrode line 841, and second branch electrode line 842.

DETAILED DESCRIPTION OF PREFERRED EMBODIMENTS

The following description of the embodiments with reference to the appended drawings is used for illustrating specific embodiments which may be used for carrying out the present disclosure. The directional terms described by the present disclosure, such as "upper", "lower", "front", "back", "left", "right", "inner", "outer", "side", etc., are only directions by referring to the accompanying drawings. Thus, the adopted directional terms are used to describe and understand the present disclosure, but the present disclosure is not limited thereto. In figures, elements with similar structures are indicated by the same numbers.

The present disclosure is directed to current liquid crystal display panels, as resolution of panels is increased, the number of input terminals is also greatly increased, so that a line width of peripheral circuits is greatly reduced, resulting in a technical problem of lowering the yield of the product. The present disclosure may resolve above problem.

Embodiment 1

Figure 1:
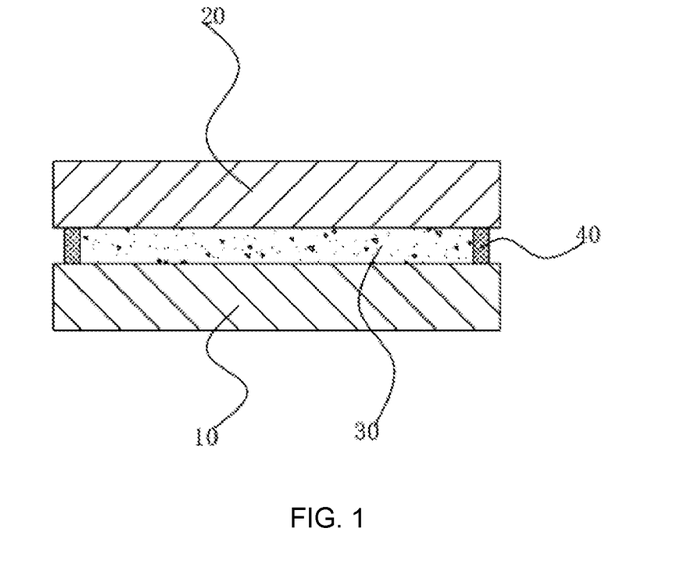
FIG. 1 a schematic structural diagram of a liquid crystal display panel in the present disclosure.

A liquid crystal display panel, as shown in FIG. 1, a liquid crystal display panel comprises a color film substrate 10 and an array substrate 20 which are disposed opposite with one another, and a seal 40 and a liquid crystal layer 30 are disposed between the color film substrate 10 and the array substrate 20.

Figure 2:
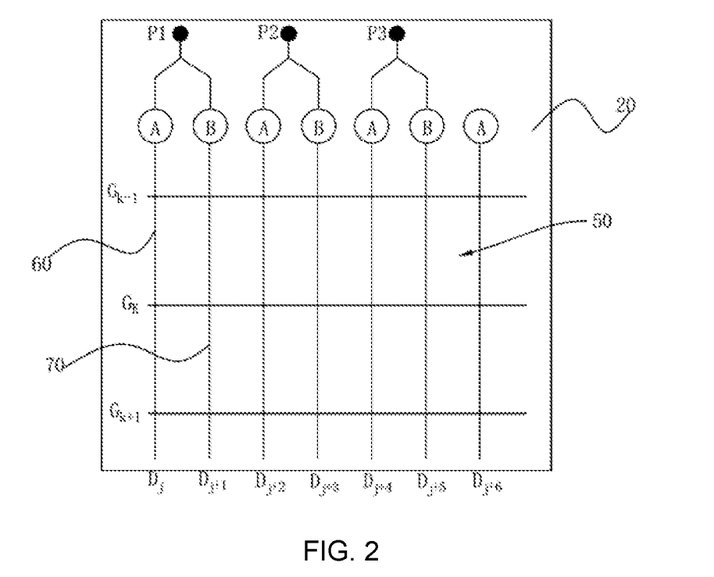
FIG. 2 is a schematic distribution diagram of scan lines and data lines on an array substrate in a first embodiment of the present disclosure.
Figure 3:
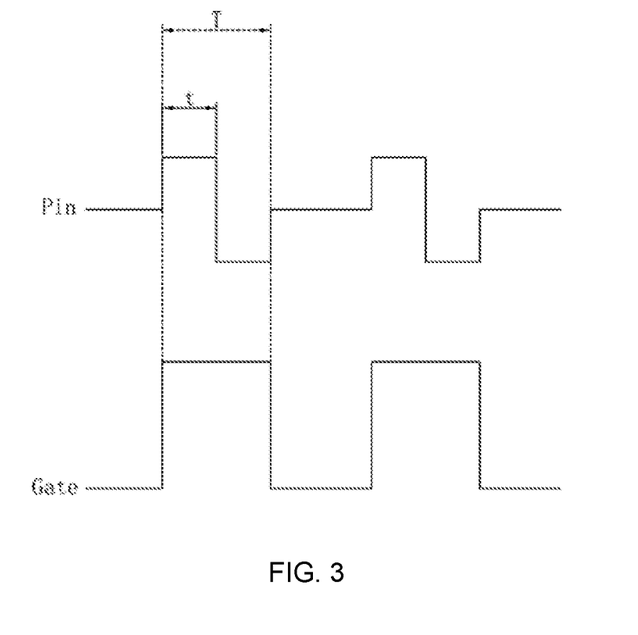
FIG. 3 is a schematic timing diagram of an alternative current signal and a scan signal in a first embodiment of the present disclosure.

As shown in FIG. 2, a pixel unit 50, a plurality of input terminals Pin, a plurality of scan lines Gate, and a plurality of data lines Date are disposed on the array substrate 20 in an array arrangement. The data lines $D_j$, $D_{j+1}$ ... $D_{j+6}$ are arranged along lateral intervals, the scan lines Gate are arranged along a longitudinal direction, the scan lines Gate and the data lines Date are crisscrossed to form a grid structure corresponding to the pixel unit 50, and j is a positive integer and is greater than or equal to 1. Each of the scan lines Gate is respectively connected to a column of the pixel unit 50, and each of the data lines Date is respectively connected to a row of the pixel unit 50.

Wherein each of the input terminals Pin is respectively connected to at least two data lines Date, a signal screening unit in series between at least part of the data lines Date and the corresponding input terminal Pin. The input terminal Pin is connected to an alternating current signal, and the signal screening unit is used for screening the alternating current signal to select a positive voltage signal or a negative voltage signal to the data lines Date.

An input terminal Pin is respectively connected to at least two or more data lines Date and a signal screening unit screens alternative current, which reduces the number of the input terminals Pin during panel design and production and reduce a risk of short circuit in inputting form data lines Date. Meanwhile, a line width of peripheral circuits does not need to be narrower in design, which may effectively reduce a difficulty of OLB and the number of flip chip films, and increase a boding strength of the flip chip films and product yield.

Further, the signal screening unit which is independent with one another is connected in series between all of the data lines Date and the corresponding input terminal Pin, a first signal screening unit A is connected to a first data line 60 screens and passes the positive voltage signal, and a second signal screening unit B is connected to a second data line 70 screens and passes the negative voltage signal.

In one embodiment, each of the input terminals Pin is respectively connected to any two adjacent signal screening units. A nth data line Date is the first data line 60, a (n+1)th data line Date is the second data line 70, and n is a positive integer and is greater than or equal to 1.

It should be noted that, referring to FIG. 2, a left terminal is the scan signal receiving terminal of the scan lines Gate, a first input terminal P1, a second input terminal P2, and a third input terminal P3 are sequentially arranged from left to right, and the first data line 60 and the second data line 70 are alternately arranged. A first scan line $G_{k-1}$, a second scan line $G_k$, and a third scan line $G_{k+1}$ are arranged from top to bottom, k is a positive integer and is greater than or equal to 2.

It should be noted that, in an actual application, one input terminal Pin can also be respectively connected to three, four or more signal screening units.

Figure 4:
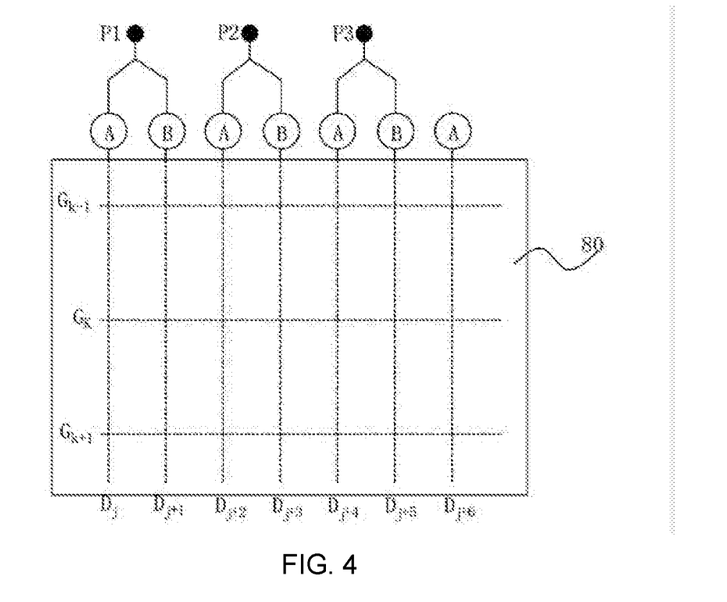
FIG. 4 is a schematic structure and distribution diagram of a common electrode in a first embodiment of the present disclosure.

Referring to FIG. 2 and FIG. 4, in one embodiment, the alternating current signal is a positive and negative alternating periodic square wave voltage signal. A time of one cycle is T, and a time of half cycle is t.

It should be understood that, when the scan lines Gate are connected to a positive voltage scan signal, the scan line Gate are turned on. In a front time t when the scan lines Gate are turned on, the input terminals Pin receive the positive voltage signal, and the data lines Date connected to the first signal screening unit A are turned on and connected to positive voltage signal, and the data lines connected to the second signal screening unit B are turned off. In a back time t when the scan lines Gate are turned on, the input terminals Pin receive the negative voltage signal, and the data lines Date connected to the first signal screening unit A are turned off, and the data lines connected to the second signal screening unit B are turned on and connected to negative voltage signal, thereby achieving liquid crystal effective row inversion display.

As shown in FIG. 4, a common electrode 80 corresponding to the pixel unit 50 is disposed on the color film substrate 10, the common electrode 80 is connected to a common voltage signal Vcom to achieve liquid crystal inversion by using a voltage difference between the common electrode 80 and the data lines Date.

Figure 5:
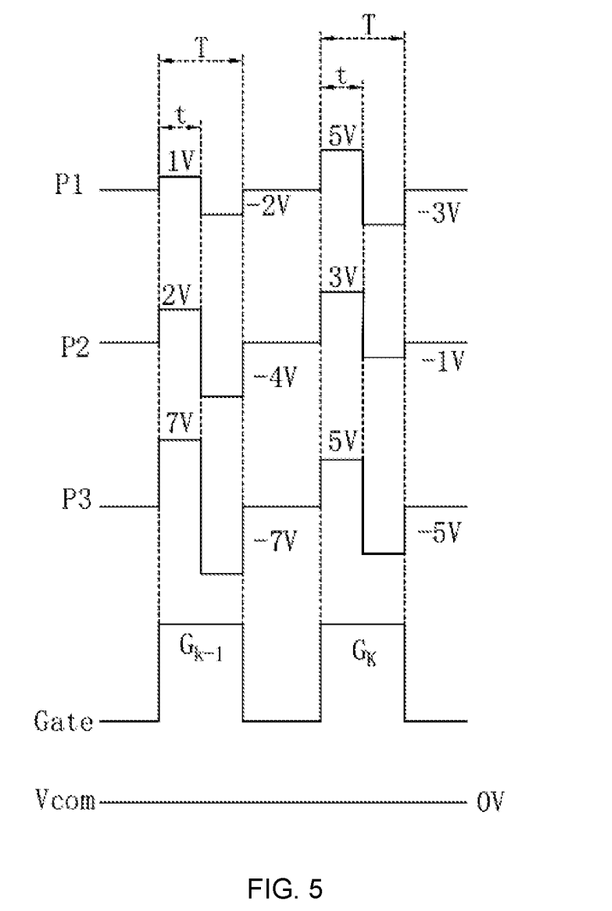
FIG. 5 is a schematic driving timing diagram of a liquid crystal display panel in a first embodiment of the present disclosure.

As shown in FIG. 4 and FIG. 5, in one embodiment, an input voltage of the common electrode 80 is 0V, when the first scan line $G_{k-1}$ is turned on, in an input alternative current signal of the first input terminal P1, a voltage of the positive voltage signal is 1V, and a voltage of the negative voltage signal is −2V. In an input alternative current signal of the second input terminal P2, the voltage of the positive voltage signal is 2V, and the voltage of the negative voltage signal is −4V. In an input alternative current signal of the third input terminal P3, the voltage of the positive voltage signal is 7V, and the voltage of the negative voltage signal is −7V.

When the second scan line $G_k$ is turned on, in the input alternative current signal of the first input terminal P1, the voltage of the positive voltage signal is 5V, and the voltage of the negative voltage signal is −3V. In the input alternative current signal of the second input terminal P2, the voltage of the positive voltage signal is 3V, and the voltage of the negative voltage signal is −1V. In the input alternative current signal of the third input terminal P3, the voltage of the positive voltage signal is 5V, and the voltage of the negative voltage signal is −5V. m is a positive integer and is greater than or equal to 1.

Figure 6:
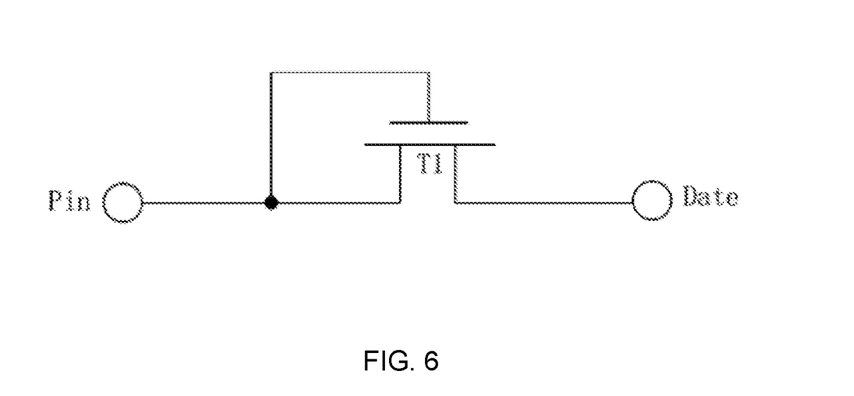
FIG. 6 is a schematic circuit diagram of a first signal screening unit in the present disclosure.

As shown in FIG. 6, specifically, the first signal screening unit A comprises a first switch transistor T1, a source of the first switch transistor T1 is electrically connected to the corresponding input terminal Pin, a drain of the first switch transistor T1 is electrically connected to the corresponding the data line Date, and a gate of the first switch transistor T1 is electrically connected to the source of the first switch transistor T1.

Figure 7:
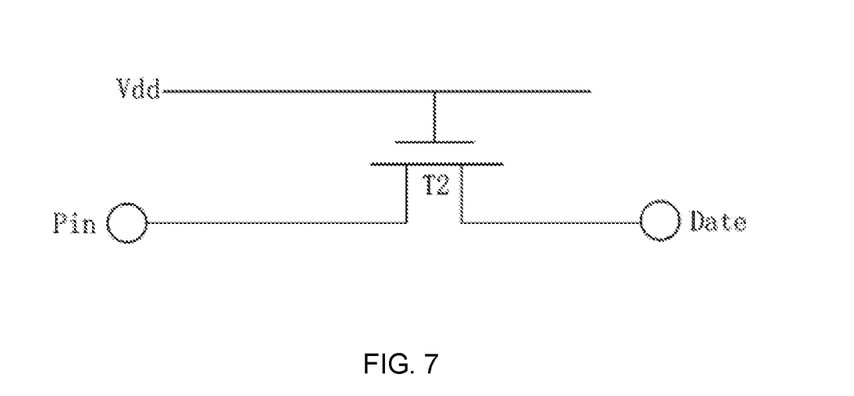
FIG. 7 is a schematic circuit diagram of a second signal screening unit in the present disclosure.

As shown in FIG. 7, specifically, the second signal screening unit B comprises a second switch transistor T2, a source of the second switch transistor T2 is electrically connected to the corresponding input terminal Pin, a drain of the second switch transistor T2 is electrically connected to the corresponding the data line Date, and a gate of the second switch transistor T2 is electrically connected to a power line Vdd.

Embodiment 2

Figure 8:
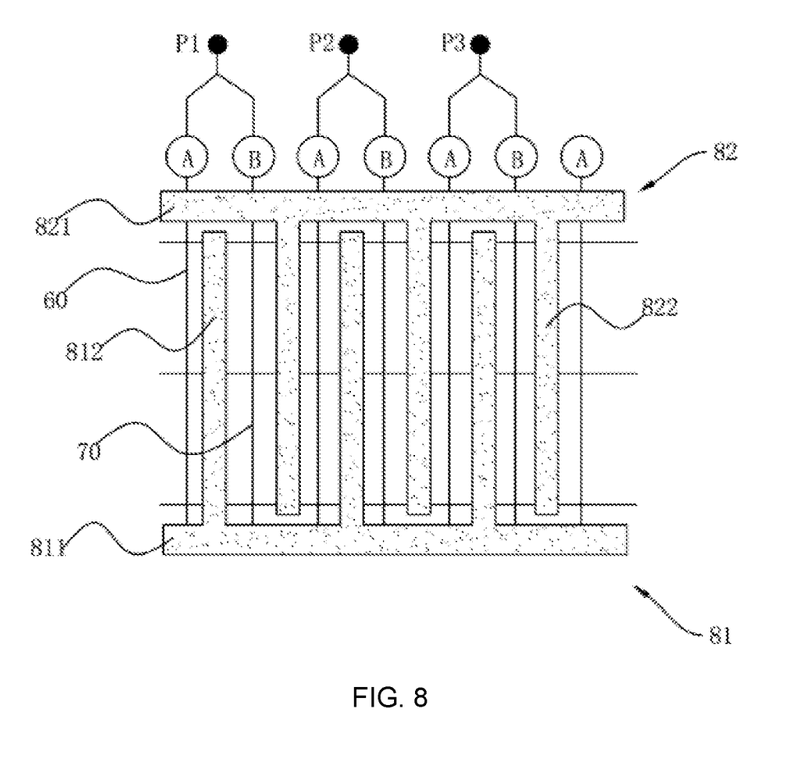
FIG. 8 is a schematic structure and distribution diagram of a common electrode in a second embodiment of the present disclosure.

A liquid crystal display panel, as shown in FIG. 8, A difference from the embodiment 1 is that an arrangement of a common electrode 80 is different.

Specifically, a common electrode 80 corresponding to the pixel unit 50 is disposed on the color film substrate 10, the common electrode 80 comprises a first electrode 81 and a second electrode 82 which are independent with one another. The first electrode 82 is connected to a first common voltage signal Vcom1, the second electrode 83 is connected to a second common voltage signal Vcom2.

Wherein, the first electrode 81 comprises a first main electrode line 811 disposed along a lateral direction and a plurality of first branch electrode lines 812 disposed along a longitudinal direction and electronically connected to the first main electrode 811. The first branch electrode lines 812 are arranged in a lateral interval, and each of the first branch electrode lines 812 corresponds to a row of the pixel unit 50.

Wherein, the second electrode 82 comprises a second main electrode line 821 disposed along a lateral direction and a plurality of second branch electrode lines 822 disposed along a longitudinal direction and electronically connected to the second main electrode 821. The second branch electrode lines 822 are arranged in a lateral interval, and each of the second branch electrode lines 822 corresponds to a row of the pixel unit 50.

By designing the common electrode 80 as a grid structure, a positive voltage or a negative voltage corresponding to the data lines Date may be respectively input to the first electrode 81 and the second electrode 82, thereby achieving liquid crystal frame inversion, preventing liquid crystal electrical failure caused by long-time display of liquid crystals and improving display failure.

Figure 9:
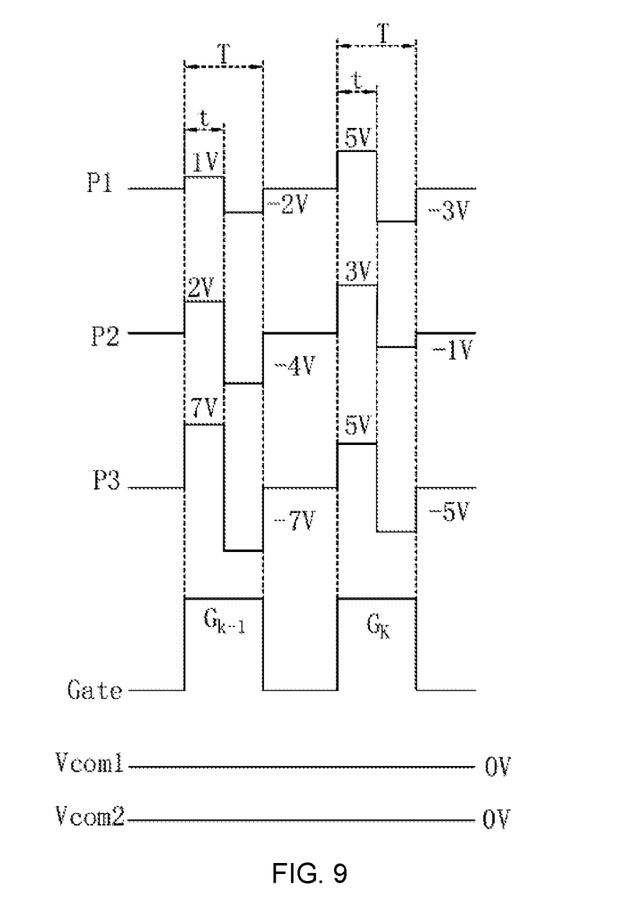
FIG. 9 is a schematic driving timing diagram of a liquid crystal display panel during a mth frame in a second embodiment of the present disclosure.

As shown in FIG. 9, in one embodiment, in mth frame, input voltages of the first electrode 81 and the second electrode 82 are both 0V. When the first scan line $G_{k-1}$ is turned on, in an input alternative current signal of the first input terminal P1, a voltage of the positive voltage signal is 1V, and a voltage of the negative voltage signal is −2V. In an input alternative current signal of the second input terminal P2, the voltage of the positive voltage signal is 2V, and the voltage of the negative voltage signal is −4V. In an input alternative current signal of the third input terminal P3, the voltage of the positive voltage signal is 7V, and the voltage of the negative voltage signal is −7V.

When the second scan line $G_k$ is turned on, in the input alternative current signal of the first input terminal P1, the voltage of the positive voltage signal is 5V, and the voltage of the negative voltage signal is −3V. In the input alternative current signal of the second input terminal P2, the voltage of the positive voltage signal is 3V, and the voltage of the negative voltage signal is −1V. In the input alternative current signal of the third input terminal P3, the voltage of the positive voltage signal is 5V, and the voltage of the negative voltage signal is −5V. m is a positive integer and is greater than or equal to 1.

Figure 10:
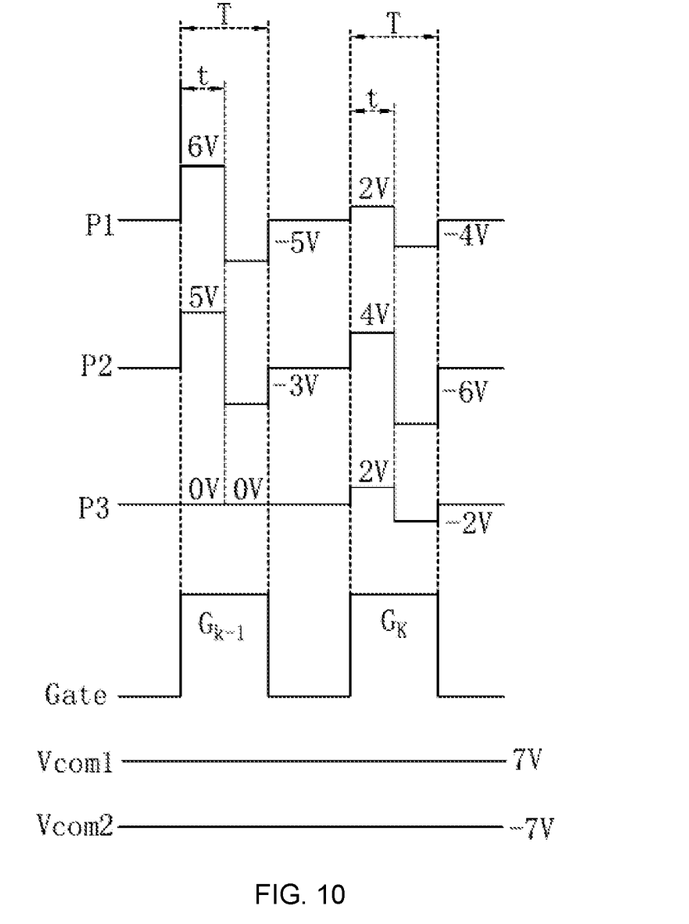
FIG. 10 is a schematic driving timing diagram of a liquid crystal display panel during a (m+1)th frame in a second embodiment of the present disclosure.

As shown in FIG. 10, in (m+1)th frame, an input voltage of the first electrode 81 is greater than the first data line 60, an input voltage of the second electrode 82 is less than the second data line 70.

In one embodiment, in (m+1)th frame, an input voltage of the first electrode 81 is 7V, and an input voltage of the second electrode 82 is −7V.

When the first scan line $G_{k-1}$ is turned on, in the front time t, a voltage difference between the first data line 60 connected to the first input terminal P1 and the first electrode 81 is 6V, a voltage difference between the first data line 60 connected to the second input terminal P2 and the first electrode 81 is 5V, and a voltage difference between the first data line 60 connected to the third input terminal P3 and the first electrode 81 is 0V. In the back time t, a voltage difference between the second data line 70 connected to the first input terminal P1 and the second electrode 82 is −5V, a voltage difference between the second data line 70 connected to the second input terminal P2 and the second electrode 82 is −3V, and a voltage difference between the second data line 70 connected to the third input terminal P3 and the second electrode 82 is 0V.

When the first scan line $G_k$ is turned on, in the front time t, a voltage difference between the first data line 60 connected to the first input terminal P1 and the first electrode 81 is 2V, a voltage difference between the first data line 60 connected to the second input terminal P2 and the first electrode 81 is 4V, and a voltage difference between the first data line 60 connected to the third input terminal P3 and the first electrode 81 is 2V. In the back time t, a voltage difference between the second data line 70 connected to the first input terminal P1 and the second electrode 82 is −4V, a voltage difference between the second data line 70 connected to the second input terminal P2 and the second electrode 82 is −6V, and a voltage difference between the second data line 70 connected to the third input terminal P3 and the second electrode 82 is −2V.

In (m+1)th frame, an input voltage in the first electrode 81 corresponding to the first data line 60 is greater than a positive voltage of the positive voltage signal, and an input voltage in the second electrode 82 corresponding to the second data line 70 is less than a negative voltage of the negative voltage signal, thereby achieving liquid crystal frame inversion, preventing liquid crystal electrical failure caused by long-time display of liquid crystals and improving display failure.

Embodiment 3

Figure 11:
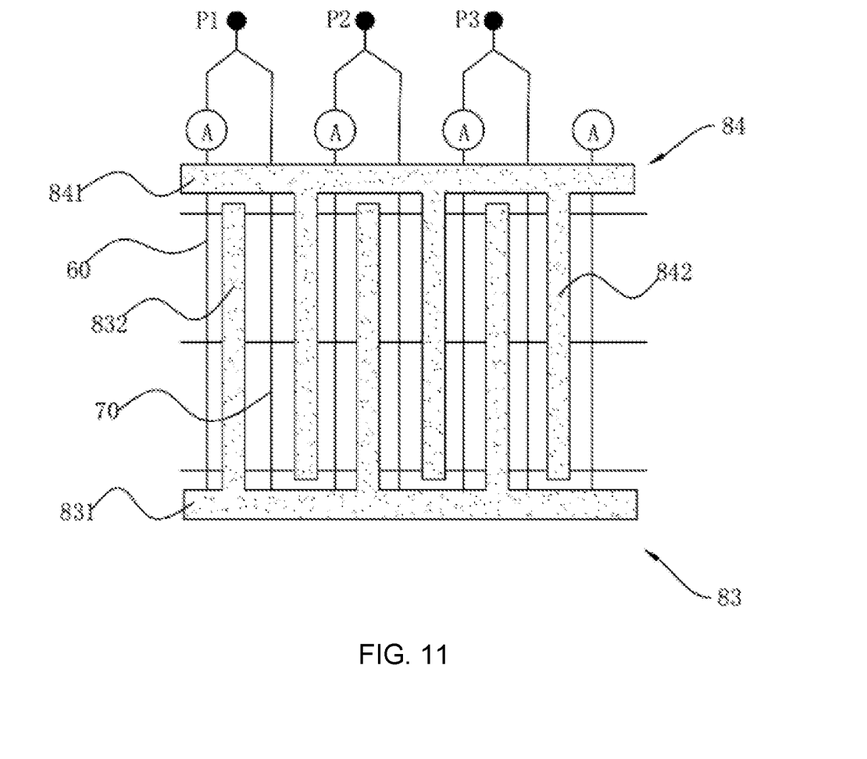
FIG. 11 is a schematic structure and distribution diagram of a common electrode in a third embodiment of the present disclosure.

A liquid crystal display panel, as shown in FIG. 11, a difference from the embodiment 1 is that a first signal screening unit A which is independent with one another is connected in series between a first data line 60 and the corresponding input terminal, a second data line 70 is not connected to the signal screening unit, and the first signal screening unit A is used for screening an alternative current signal and passing the positive voltage signal.

When the gate lines Gate are turned on, the first data line 60 butted with the positive voltage signal is charged. When a timing of the negative voltage signal arrives, the negative voltage is negatively charged to the second data line 70 without the signal screening unit, so that the second data line 70 performs voltage reversal pre-charging, which not only is useful to improve a panel refresh rate and a charging rate, but also reduces a risk of liquid crystal failure.

Specifically, the first signal screening unit A comprises a first switch transistor T1, a source of the first switch transistor T1 is electrically connected to the corresponding input terminal Pin, a drain of the first switch transistor T1 is electrically connected to the corresponding the data line Date, and a gate of the first switch transistor T1 is electrically connected to the source of the first switch transistor T1.

Specifically, a common electrode 80 corresponding to the pixel unit 50 is disposed on the color film substrate 10, and the common electrode 80 comprises a first electrode 83 and a second electrode 84 which are independent with one another. The first electrode 83 is connected to a first common voltage signal Vcom1, and the second electrode 84 is connected to a second common voltage signal Vcom2.

Wherein, the first electrode 83 comprises a first main electrode line 831 disposed along a lateral direction and a plurality of first branch electrode lines 832 disposed along a longitudinal direction and electronically connected to the first main electrode 831, the first branch electrode line 832 is arranged along a lateral interval, and each of the first branch electrode line 832 corresponds to the pixel unit 50.

Wherein, the second electrode 84 comprises a second main electrode line 841 disposed along a lateral direction and a plurality of second branch electrode lines 842 disposed along a longitudinal direction and electronically connected to the second main electrode 841, the second branch electrode line 842 is arranged along a lateral interval, and each of the second branch electrode line 842 corresponds to the pixel unit 50.

Figure 12:
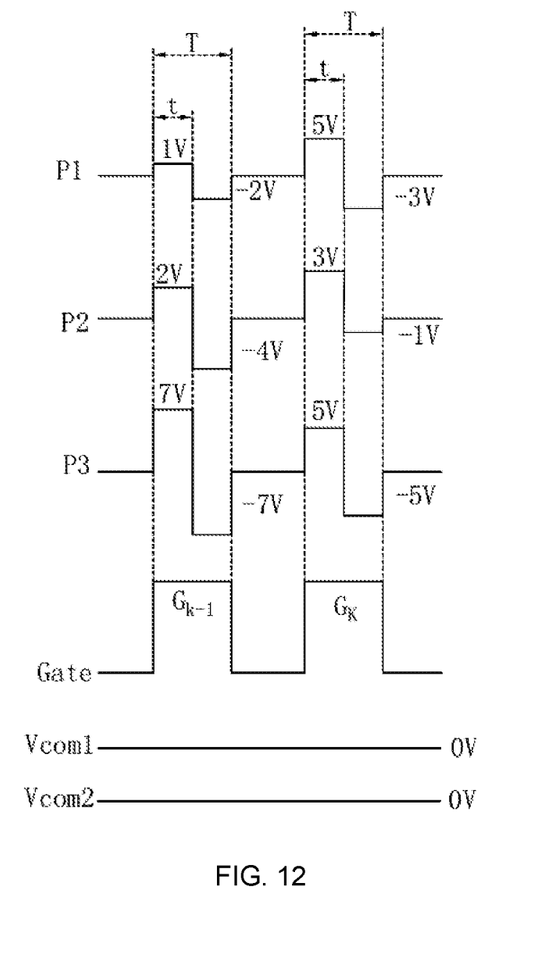
FIG. 12 is a schematic driving timing diagram of a liquid crystal display panel during a mth frame in a third embodiment of the present disclosure.

As shown in FIG. 12, in one embodiment, during in mth frame, input voltages of the first electrode 81 and the second electrode 82 are both 0V. When a first scan line $G_{k-1}$ is turned on, in an input alternative current signal of a first input terminal P1, a voltage of the positive voltage signal is 1V, and a voltage of the negative voltage signal is -2V. In an input alternative current signal of the second input terminal P2, the voltage of the positive voltage signal is 2V, and the voltage of the negative voltage signal is -4V. In an input alternative current signal of the third input terminal P3, the voltage of the positive voltage signal is 7V, and the voltage of the negative voltage signal is -7V.

When the second scan line $G_k$ is turned on, in the input alternative current signal of the first input terminal P1, the voltage of the positive voltage signal is 5V, and the voltage of the negative voltage signal is -3V. In the input alternative current signal of the second input terminal P2, the voltage of the positive voltage signal is 3V, and the voltage of the negative voltage signal is -1V. In the input alternative current signal of the third input terminal P3, the voltage of the positive voltage signal is 5V, and the voltage of the negative voltage signal is -5V. m is a positive integer and is greater than or equal to 1.

Figure 13:
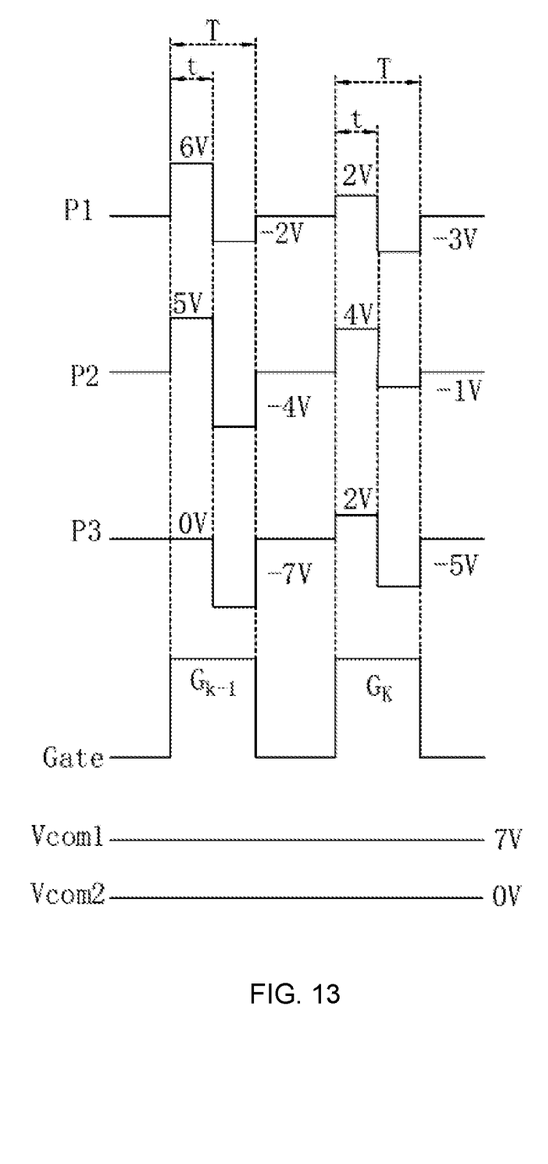
FIG. 13 is a schematic driving timing diagram of a liquid crystal display panel during a (m+1)th frame in a third embodiment of the present disclosure.

As shown in FIG. 13, in (m+1)th frame, an input voltage of the first electrode 81 is 7V, and an input voltage of the second electrode 82 is 0V.

When the first scan line $G_{k-1}$ is turned on, in the front time t, a voltage difference between the first data line 60 connected to the first input terminal P1 and the first electrode 81 is 6V, a voltage difference between the first data line 60 connected to the second input terminal P2 and the first electrode 81 is 5V, and a voltage difference between the first data line 60 connected to the third input terminal P3 and the first electrode 81 is 0V. In the back time t, a voltage difference between the second data line 70 connected to the first input terminal P1 and the second electrode 82 is -2V, a voltage difference between the second data line 70 connected to the second input terminal P2 and the second electrode 82 is -4V, and a voltage difference between the second data line 70 connected to the third input terminal P3 and the second electrode 82 is -7V.

When the first scan line $G_k$ is turned on, in the front time t, a voltage difference between the first data line 60 connected to the first input terminal P1 and the first electrode 81 is 2V, a voltage difference between the first data line 60 connected to the second input terminal P2 and the first electrode 81 is 4V, and a voltage difference between the first data line 60 connected to the third input terminal P3 and the first electrode 81 is 2V. In the back time t, a voltage difference between the second data line 70 connected to the first input terminal P1 and the second electrode 82 is -4V, a voltage difference between the second data line 70 connected to the second input terminal P2 and the second electrode 82 is -1V, and a voltage difference between the second data line 70 connected to the third input terminal P3 and the second electrode 82 is -5V.

By designing the common electrode 80 as a grid structure, a positive voltage or a negative voltage corresponding to the data lines Date may be respectively input to the first electrode 81 and the second electrode 82, thereby achieving liquid crystal frame inversion, preventing liquid crystal electrical failure caused by long-time display of liquid crystals and improving display failure. Meanwhile, the second data line 70 is precharged without the signal screening unit by timing driving, which reduces the data input amount of the common electrode 80, transmits data with lower power consumption, and reduces energy consumption.

Advantageous effects of the present disclosure is that a terminal Pin is respectively connected to at least two or more data lines Date and a signal screening unit screens alternative current, which reduces the number of the input terminals Pin during panel design and production and reduce a risk of short circuit in inputting form data lines Date. Meanwhile, a line width of peripheral circuits does not need to be narrower in design, which may effectively reduce a difficulty of OLB and the number of flip chip films, and increase a boding strength of the flip chip films and product yield.

As mentioned above, while the present disclosure has been disclosed via preferred embodiments as above, the preferred embodiments are not intended to limit the disclosure. Those skilled in the art can make various modifications and alternations without departing from the spirit and scope of the disclosure. The scope of protection of the disclosure is defined by the claims.

What is claimed is:

1. A liquid crystal display panel, wherein the liquid crystal display panel comprises a color film substrate and an array substrate, and a pixel unit, a plurality of input terminals, a plurality of crisscrossed scan lines and data lines, which are disposed on the array substrate in an array arrangement;

wherein each of the input terminals is respectively connected to at least two data lines, a signal screening unit in series between at least part of the data lines and the corresponding input terminal, and the input terminal is connected to an alternating current signal, and the signal screening unit is used for screening the alternating current signal to select a positive voltage signal or a negative voltage signal to the data lines;

wherein first signal screening units independent with each other are connected in series between a first data line and the corresponding input terminal, a second data line is not connected to the signal screening unit, and the first signal screening units are used for screening and passing the positive voltage signal;

wherein a common electrode corresponding to the pixel unit is disposed on the color film substrate, the common electrode comprises a first electrode and a second electrode which are independent with one another; the first electrode comprises a first main electrode line disposed along a lateral direction and a plurality of first branch electrode lines disposed along a longitudinal direction and electronically connected to the first main electrode line; the second electrode comprises a second main electrode line disposed along a lateral direction and a plurality of second branch electrode lines disposed along a longitudinal direction and electronically connected to the second main electrode line; and the first branch electrode lines and the second branch electrode lines are arranged along lateral intervals; and wherein, in mth frame, the input voltages of the first electrode and the second electrode are both 0V; and in (m+1)th frame, the input voltage of the first electrode is greater than the second data line, the input voltage of the second electrode is 0V, and m is a positive integer and is greater than or equal to 1.

2. The liquid crystal display panel as claimed in claim 1, wherein the scan lines and the data lines are crisscrossed to form a grid structure corresponding to the pixel unit, each of the scan lines is respectively connected to a column of the pixel unit, and each of the data lines is respectively connected to a row of the pixel unit.

3. A liquid crystal di splay panel, wherein the liquid crystal di splay panel comprises a color film substrate and an array substrate, and a pixel unit, a plurality of input terminals, a plurality of crisscrossed scan lines and data lines, which are disposed on the array substrate in an array arrangement;

wherein, each of the input terminals is respectively connected to at least two data lines, a signal screening unit in series between at least part of the data lines and the corresponding input terminal, the input terminal is connected to an alternating current signal, and the signal screening unit is used for screening the alternating current signal to select a positive voltage signal or a negative voltage signal to the data lines;

wherein each of the data lines is arranged along a lateral interval, wherein the signal screening unit which is independent with one another is connected in series between all of the data lines and the corresponding input terminal, a first signal screening unit is connected to a first data line screens and passes the positive voltage, and a second signal screening unit is connected to a second data line screens and passes the negative signal;

wherein a common electrode corresponding to the pixel unit is disposed on the color film substrate, the common electrode comprises a first electrode and a second electrode which are independent with one another; the first electrode comprises a first main electrode line disposed along a lateral direction and a plurality of first branch electrode lines disposed along a longitudinal direction and electronically connected to the first main electrode; the second electrode comprises a second main electrode line disposed along a lateral direction and a plurality of second branch electrode lines disposed along a longitudinal direction and electronically connected to the second main electrode; and the first branch electrode lines and the second branch electrode lines are arranged along lateral intervals; and wherein in mth frame, input voltages of the first electrode and the second electrode are both 0V; and in (m+1)th frame, the input voltage of the first electrode is greater than the first data line, the input voltage of the second electrode is less than the second data line, and m is a positive integer and is greater than or equal to 1.

4. The liquid crystal display panel as claimed in claim 3, wherein the scan lines and the data lines are crisscrossed to form a grid structure corresponding to the pixel unit, each of the scan lines is respectively connected to a column of the pixel unit, and each of the data lines is respectively connected to a row of the pixel unit.

5. The liquid crystal display panel as claimed in claim 3, wherein each of the input terminals is respectively connected to any two adjacent signal screening units; and a nth data line is the first data line, a (n+1)th data line is the second data line, and n is a positive integer and is greater than or equal to 1.

6. The liquid crystal display panel as claimed in claim 3, wherein the first signal screening unit comprises a first switch transistor, a source of the first switch transistor is electrically connected to the corresponding input terminal, a drain of the first switch transistor is electrically connected to the corresponding the data line, and a gate of the first switch transistor is electrically connected to the source of the first switch transistor.

7. The liquid crystal display panel as claimed in claim 3, wherein the second signal screening unit comprises a second switch transistor, a source of the second switch transistor is electrically connected to the corresponding input terminal, a drain of the second switch transistor is electrically connected to the corresponding the data line, and a gate of the second switch transistor is electrically connected to a power line.

* * * * *